(12) United States Patent
Yamada

(10) Patent No.: US 10,104,251 B2
(45) Date of Patent: Oct. 16, 2018

(54) IMAGE READING DEVICE AND IMAGE DATA TRANSMISSION METHOD

(71) Applicant: BROTHER KOGYO KABUSHIKI KAISHA, Nagoya, Aichi (JP)

(72) Inventor: Takatsugu Yamada, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/849,847

(22) Filed: Dec. 21, 2017

(65) Prior Publication Data
US 2018/0183959 A1 Jun. 28, 2018

(30) Foreign Application Priority Data

Dec. 26, 2016 (JP) ................................. 2016-252057

(51) Int. Cl.
H04N 1/12 (2006.01)
H04N 1/44 (2006.01)
H04N 1/00 (2006.01)

(52) U.S. Cl.
CPC ..... *H04N 1/00798* (2013.01); *H04N 1/00244* (2013.01); *H04N 1/00411* (2013.01); *H04N 1/00477* (2013.01); *H04N 1/4413* (2013.01); *H04N 2201/0081* (2013.01); *H04N 2201/0094* (2013.01)

(58) Field of Classification Search
CPC ........... H04N 1/00798; H04N 1/00244; H04N 1/00411; H04N 1/00477; H04N 1/4413; H04N 2201/0081; H04N 2201/0094
See application file for complete search history.

(56) References Cited

U.S. PATENT DOCUMENTS

| 2004/0114199 | A1 | 6/2004 | Kanno | |
| 2006/0053148 | A1* | 3/2006 | Tamai | H04N 1/00222 |
| 2008/0297849 | A1* | 12/2008 | Fukasawa | H04N 1/00347 358/1.16 |
| 2009/0097050 | A1* | 4/2009 | Yoshida | H04N 1/00347 358/1.13 |

(Continued)

FOREIGN PATENT DOCUMENTS

| JP | 2004193721 A | 7/2004 |
| JP | 2004208048 A | 7/2004 |

(Continued)

*Primary Examiner* — Iriana Cruz
(74) *Attorney, Agent, or Firm* — Scully, Scott, Murphy & Presser, P.C.

(57) ABSTRACT

An image reading device causes an image reader to read an original document and generate image data, which is stored in a storage with a data name. The image reading device obtains lists of data names regarding image data stored in a plurality of external devices, respectively. It is determined whether the data name of the image data stored in the storage is included in the lists received from the plurality of external devices. The image data stored in the storage is transmitted to all the plurality of external devices when the data name of the image data stored in the storage is not included in any of the lists received from the external devices. When the data name of the image data stored in the storage is included in at least one of the lists as received, the image data is not transmitted to anyone of the external devices.

11 Claims, 9 Drawing Sheets

(56) References Cited

U.S. PATENT DOCUMENTS

| | | | |
|---|---|---|---|
| 2011/0019216 A1 | 1/2011 | Kataoka et al. | |
| 2015/0043028 A1* | 2/2015 | Osajima | G06F 3/1258 358/1.15 |
| 2016/0205275 A1* | 7/2016 | Kadobayashi | H04N 1/00204 358/1.15 |

FOREIGN PATENT DOCUMENTS

| | | |
|---|---|---|
| JP | 2005318545 A | 11/2005 |
| JP | 2007306230 A | 11/2007 |
| JP | 2009253588 A | 10/2009 |
| JP | 2011029915 A | 2/2011 |

* cited by examiner

| Order | Transmission Method | Destination Address | Log-In Name | Password |
|---|---|---|---|---|
| 1 | FTP | Profiles A | aaa | 111 |
| 2 | CIFS | Shared Folder Address A | bbb | 222 |
| 3 | FTP | Profiles B | ccc | 333 |
| 4 | FTP | Profiles C | ddd | 444 |
| 5 | CIFS | Shared Folder Address B | eee | 555 |
| 6 | FTP | Profiles D | fff | 666 |

FIG. 3

IMAGE READING DEVICE AND IMAGE DATA TRANSMISSION METHOD

CROSS-REFERENCE TO RELATED APPLICATIONS

This application claims priority under 35 U.S.C. § 119 from Japanese Patent Application No. 2016-252057 filed on Dec. 26, 2016. The entire subject matter of the application is incorporated herein by reference.

BACKGROUND

Technical Field

The present disclosures relate to an image reading device and an image data transmitting method. More specifically, the present disclosures relate to a technique of transmitting image data, which is generated by an image reading device, to external devices.

Related Art

Conventionally, there has been known a technique of reading an image on an original document and generate image data with an image reading device capable of communicating with external devices, and transmitting the generated image data to external devices designated as destinations.

A system employing the above conventional technique typically includes an image reading device and a server device. The image reading device typically executes a process to establish a connection with the server device. When the connection is established, the image reading device reads an original document to generate image data, and transmits the image data to the server device with which the connection has been established. When the connection is not established, the image reading device does not read the original document, and thus, does not generate image data or transmit the same to the server device.

SUMMARY

When the image data is to be transmitted to a plurality of external devices, there could occur one of three cases below. In a first case, the image data is successfully transmitted to all the external devices. In a second case, transmission of the image data to anyone of the external devices is failed. In a third case, the image data is successfully transmitted to some of the plurality of external devices, while the transmission to the other external devices is failed.

Regarding failure of transmission of the image data from the image reading device to an external device, there are, for example, two cases as follows. In a first case, a data name of the image data the reading device attempts to transmit is already assigned to image data stored in the external device. In such a case, if the image reading device transmits the image data to the external device, the data having the same name and exists in the external device is overwritten with the transmitted image data. Therefore, the image reading device cannot transmit the image data. That is, transmission of the image data from the image reading device to the external device is failed.

In a second case, a storable size of the data of external device, which is the destination of transmission, is smaller than the data size of the image data the image reading device attempts to transmit. In such a case, since the external device cannot store the image data transmitted from the image reading device, the image reading device cannot transmit the image data. That is, transmission of the image data from the image reading device to the external device is failed.

Data names of a plurality of pieces of image data stored in external devices and/or available capacities to store data of respective external devices are generally different in individual external devices. Therefore, when image data is transmitted form the image reading device to a plurality of external devices, it could occur a situation where transmission to part of the external devices is completed successfully, while transmission to the other external devices are failed.

When the image data is successfully transmitted to some of the plurality of external devices, while transmission of the image data to the other external devices is failed, a problem indicated below arises. If the user intends to re-designate the external devices, to which the data transmission was failed, it is troublesome for the user to search for the external devices to be re-designated and designate the same. In particular, when the number of external devices is relatively large, the troublesomeness is significant. In order to avoid such a troublesome process of re-designating the external devices, it may be considered to re-transmit the data to all the external devices. In such a case, however, the same data is re-transmitted to the external devices to which the data was successfully transmitted previously. Such a procedure is useless. Further, such a procedure arises another problem. That is, when a user of an external device receives the data twice, it is unclear for the user whether the two pieces of data are the same data or not.

In consideration of the above problem, according to the present disclosures, there is provided a technique to avoid a situation where, when the image data is transmitted to a plurality of external devices and transmission to some of the plurality of external devices has been successfully completed and the image data is stored therein, while transmission to the other of the plurality of external devices has been failed and the image data is not stored therein.

According to aspects of the disclosures, there is provided an image reading device having an image reader configured to read an image on an original document and generate image data corresponding to the image on the original document, a communication interface configured to communicate with a first external device and a second external device, a storage and a controller. When the first external device and the second external device are designated as transmission destinations of the image data, the controller is configured to execute a generating process of causing the image reader to read the image on the original document and generate the image data, a storing process of storing the image data generated by the generating process in the storage with assigning a data name to the image data, a list requesting process. The list requesting process is a process of controlling the communication interface to transmit a first list request, to the first external device, requesting to transmit a first list to the image reading device, the first list being a list of data names regarding image data stored in the first external device, and transmit a second list request, to the second external device, requesting to transmit a second list to the image reading device, the second list being a list of data names regarding image data stored in the second external device. The controller is further configured to execute a list receiving process of controlling the communication interface to receive the first list transmitted from the first external device and receive the second list transmitted from the second external device. The controller is further configured to execute a data name determining process of determining whether a data name same as the data name of the image data stored in the storage is included in at least one of the first list and the second list, and a data transmitting process of controlling the communication interface to transmit the image data stored in the storage to the first external device and the second external device when it is determined in the data name determining process that the data name same as the data name of the image data stored in the storage is not included in any of the first list and the second list, and controlling the communication interface not to transmit the image data stored in the storage to anyone of the first external device and the second external device when it is determined in the data name determining process that the data name same as the image data stored in the storage is included in at least one of the first list and the second list.

According to further aspects of the present disclosures, there is provided an image reader configured to read an image on an original document and generate image data corresponding to an image on the original document, a communication interface configured to communicate with a plurality of external devices, a storage and a controller. When the plurality of external device are designated as transmission destinations of the image data, the controller is configured to execute a generating process of causing the image reader to read the image on the original document and generate the image data, a storing process of storing the image data generated by the generating process in the storage, a list requesting process of controlling the communication interface to transmit a size request, to the plurality of external devices, requesting to transmit storable data sizes representing storable data sizes of respective external devices, to the image reading device, a size receiving process of controlling the communication interface to receive the storable data size values from the plurality of external devices, respectively, a size determining process determining whether a data size of the image data stored in the storage is larger than at least one of the storable data sizes respectively received from the plurality of external devices, and a data transmitting process of controlling the communication interface to transmit the image data stored in the storage to the plurality of external devices when it is determined in the data size determining process that the data size of the image data stored in the storage is not larger than each of the storable data sizes respectively received from the plurality of external devices, and controlling the communication interface not to transmit the image data stored in the storage to anyone of the plurality of external devices when it is determined in the size determining process that the data size of the image data stored in the storage is larger than at least one of the plurality of storable data sizes respectively received from the plurality of external devices.

According to aspect of the disclosures, there is provided an image data transmission method employed in an image reading device having an image reader configured to read an image of an original document and generate image data corresponding to the image on the original document, a communication interface configured to communicate with a first external device, a second external device and a storage. The method defines transmission of the image data on the original document when the first external device and the second external device are designated as transmission destinations of the image data. The method includes a generating step of causing the image reader to read the image on the original document and generate the image data, a storing step of storing the image data generated by the generating step in the storage with assigning a data name to the image data, a list requesting step of controlling the communication interface to transmit a first list request, to the first external device, requesting to transmit a first list to the image reading device, the first list being a list of data names regarding image data stored in the first external device, and transmit a second list request, to the second external device, requesting to transmit a second list to the image reading device, the second list being a list of data names regarding image data stored in the second external device, a list receiving step of controlling the communication interface to receive the first list transmitted from the first external device; and receive the second list transmitted from the second external device, a data name determining step of determining whether a data name same as the data name of the image data stored in the storage is included in at least one of the first list and the second list, a data transmitting step of controlling the communication interface to transmit the image data stored in the storage to the first external device and the second external device when it is determined in the data name determining step that the data name same as the data name of the image data stored in the storage is not included in any of the first list and the second list, and controlling the communication interface not to transmit the image data stored in the storage to anyone of the first external device and the second external device when it is determined in the data name determining step that the data name same as the image data stored in the storage is included in at least one of the first list and the second list.

According to the aspects of the present disclosure, there is also provided an image data transmission method employed in an image reading device having an image reader configured to read an image of an original document and generate image data corresponding to the image on the original document, a communication interface configured to communicate with a first external device and a second external device and a storage. The method defines transmission of the image data on the original document when the first external device and the second external device are designated as transmission destinations of the image data. The method including a generating step of causing the image reader to read the image on the original document and generate the image data, a storing step of storing the image data generated by the generating step in the storage, a list requesting step of controlling the communication interface to transmit a first size request, to the first external device, requesting to transmit a first size to the image reading device, the first size representing a storable data size of the first external device, and transmit a second size request, to the second external device, requesting to transmit a second size to the image reading device, the second size representing a storable data size of the second external device. The method further includes a size receiving step of controlling the communication interface to receive the first size representing the storable data size of first external device, and to receive the second size representing the storable data size of the second external device, a size determining step of determining whether a data size of the image data stored in the storage is larger than at least one of the first size and the second size, and a data transmitting step. The data transmitting step of controlling the communication interface to transmit the image data stored in the storage to the first external device and the second external device when it is determined in the data size determining step that the data size of the image data stored in the storage is not larger than each of the first size and the second size, and controlling the communication interface not to transmit the image data stored in the storage to anyone of the first external device and the second external device when it is determined in the size determining step that the data size of the image data stored in the storage is larger than at least one of the first size and the second size.

BRIEF DESCRIPTION OF THE ACCOMPANYING DRAWINGS

FIG. 3 shows an example of a transmission destination list.

DETAILED DESCRIPTION OF THE EMBODIMENTS

Hereinafter, referring to the accompanying drawings, an MFP 100 according to embodiments of the present disclosures will be described in detail.

Figure 1:
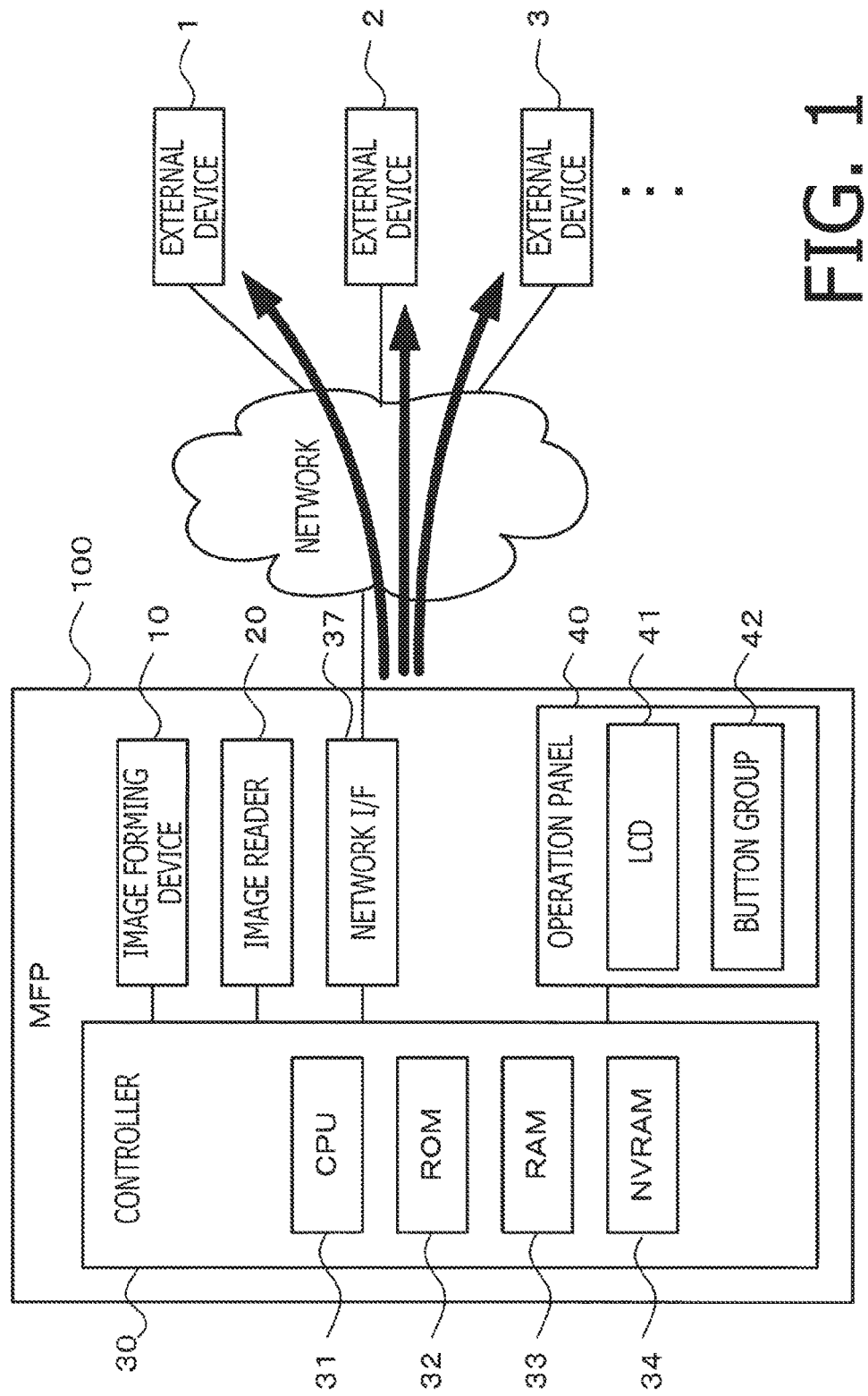
FIG. 1 is a block diagram showing an electrical configuration of an image reading device according to a first embodiment of the present disclosures.

The MFP 100 has a controller 30 which includes, as shown in FIG. 1, a CPU 31, a ROM 32, a RAM 33 and an NVRAM 34. The MFP 100 also has an image forming device 10, an image reader 20 and a network I/F 37, an operation panel 40, which are electrically connected to the controller 30.

The image forming device 10 is configured to print an image on a printing sheet. The image forming device 10 may employ an electrophotographic image forming method or an inkjet printing method. Further, the MFP 100 may be configured to form a color image or only a monochromatic image. Furthermore, the MFP 100 may perform a duplex printing, or only an simplex printing.

The image reader 20 is configured to read an image formed on an original document. The image reader 20 may read an image in accordance with a CCD method, or a CIS method. The MFP 100 according to the present disclosure may read a color image, or only a monochromatic image. The image reader 20 is an example of a reader.

The ROM 32 stores control programs to control operations of the MFP 100, various settings and initial values. The RAM 33 is used as a work area in which retrieved control programs are developed, or various pieces of data are temporarily stored. The RAM 33 is an example of a storage. The NVRAM 34 is used to store various pieces of data such as image data, various setting, and user information.

The CPU 31 controls operations of respective components of the MFP 100 in accordance with the control programs retrieved from the ROM 32 with storing results of execution of the control programs in the RAM 33 or NVRAM 34. The CPU 31 is an example of a controller. It is noted that the controller 30 may be the controller set forth in the claims. It is noted that the controller 30 is a collective term including hardware used in the controlling operations of the MFP 100, and need not correspond to a single piece of hardware existing in the MFP 100.

The network I/F 37 is hardware used to communicate with an external device connected to a network. A communication method employed in the network I/F 37 may be a wireless or wired method. The network I/F is an example of a communication interface.

The operation panel 40 is provided with an LCD 41 and a button group. The LCD 41 is an example of a display device. The controller 40 displays various pieces of information such as an operation state and/or a message for the user on the LCD 41 of the operation panel 40. The LCD 41 may be configured as a touch panel through which an input operation can be performed. In such a case, the MFP 100 may be configured to display various buttons on the LCD 41, and receive instructions based on the touched position on the touch panel.

The button group 42 includes a power button, an execution button, a cancel button and numeral keys. The controller 30 is configured such that, when an operation with respect the button group 42 is received, the controller 30 receives a signal which is generated in response to an operation of the button, thereby receiving an input of an instruction.

According to the embodiment, it is assumed that external devices 1, 2 and 3 are connected to the network. Examples of the external devices 1, 2 and 3 may include a server, a personal computer (PC), a mobile phone, a printer, and an MFP.

Next, a plural-destination transmission function implemented in the MFP 100 will be described. The plural-destination transmission function is a function of transmitting image data of an image read by the MFP 100 to a plurality of external devices.

For executing a job using the plural-destination transmission function, transmission destinations are stored, in advance, in the MFP 100. For example, the transmission destinations may be selected from an address book stored in the MFP 100. Alternatively or optionally, the transmission destinations may be directly input by the user. Further optionally or alternatively, the transmission destinations may be set to the MFP 100 through a PC.

Figure 2:
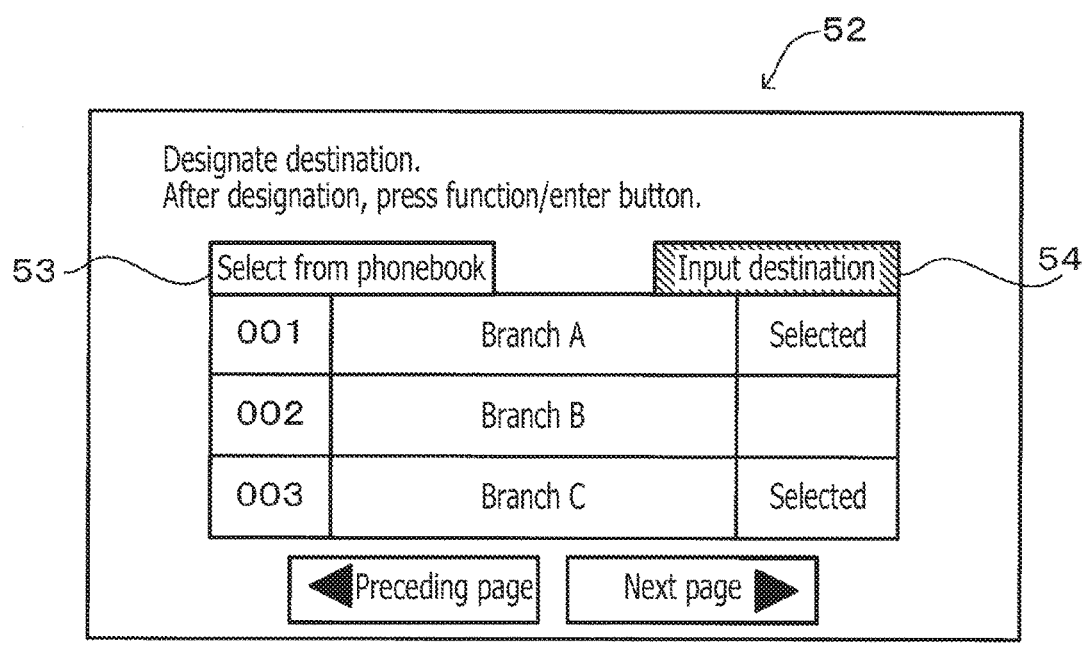
FIG. 2 shows an example of a destination designation screen.

For example, the MFP 100 may display a destination designation screen 52 as shown in FIG. 2 on the LCD 41. On the destination designation screen, a tag 53 and tag 54 are displayed. When the tag 53 is selected, the transmission destination can be selected from the address book. When the tag 54 is selected, the transmission destinations are directly input by the user.

When the user selects the tag 53, the address book is displayed on the LCD 41. On the address book displayed on the LCD 41, names of users of external devices subject to selection are indicated. The user may designate the transmission destinations by operating the button group 42 to select the names of the users. As shown in FIG. 2, the selected destinations are indicated by an indication of "selected". Therefore, the user can confirm whether selection has been made for each name of the users.

It is noted that, the MFP 100 creates a telephone book such that telephone book records are generated with the names of the users, transmission methods and transmission addressed are mutually associated, and stored in a telephone book database. The telephone book database is stored in the NVRAM 34.

In the field of the transmission method, protocols to be used for transmitting image data to the external devices are registered. The protocols used may include an FTP (file transfer protocol), an SMB (server message block), a CIFS (common internet file system), an NFS (network file system), and an HTTP (hypertext transfer protocol). In addition to differences of the protocols to be used, even if the same protocol is used, the destinations may be different, or even if the destinations are the same, portions for storing the image data (e.g., recording media, or recording areas) may be different.

In the field of the destination address (see FIG. 4), information to identify the external devices is registered. In the field of the destination address, when, for example, a protocol (e.g., FTP) regarding data transmission is registered in the field of the transmission method, a profile containing connection information of a connection destination is registered. When a network (e.g. CIFS) is registered in the field of the transmission method, a shared folder address identifying a shared folder is registered.

In the field of the log-in name (see FIG. 4), information used to log in the external devices is registered. In the field of the password, passwords which are required to access storage areas of the external devices are registered. That is, in the phonebook data based, authentication information to establish a communication with the external devices is stored.

As above, in the MFP 100, when the name is selected in the telephone book, the transmission method and the transmission address corresponding to the selected external device, a login name and a password can be obtained easily.

On the other hand, for example, when an address which is not registered in the telephone book is to be designated, the user may select the tag 54. Then, an address input screen encouraging the user to manually input the transmission method and the transmission address is displayed on the LCD 41. Then, the user may designate the destination by inputting the transmission method and the destination address by operating the button group 42. As above, the MFP 100 can accept a destination which is not registered in the telephone book and obtain authentication information thereof.

Figure 4:
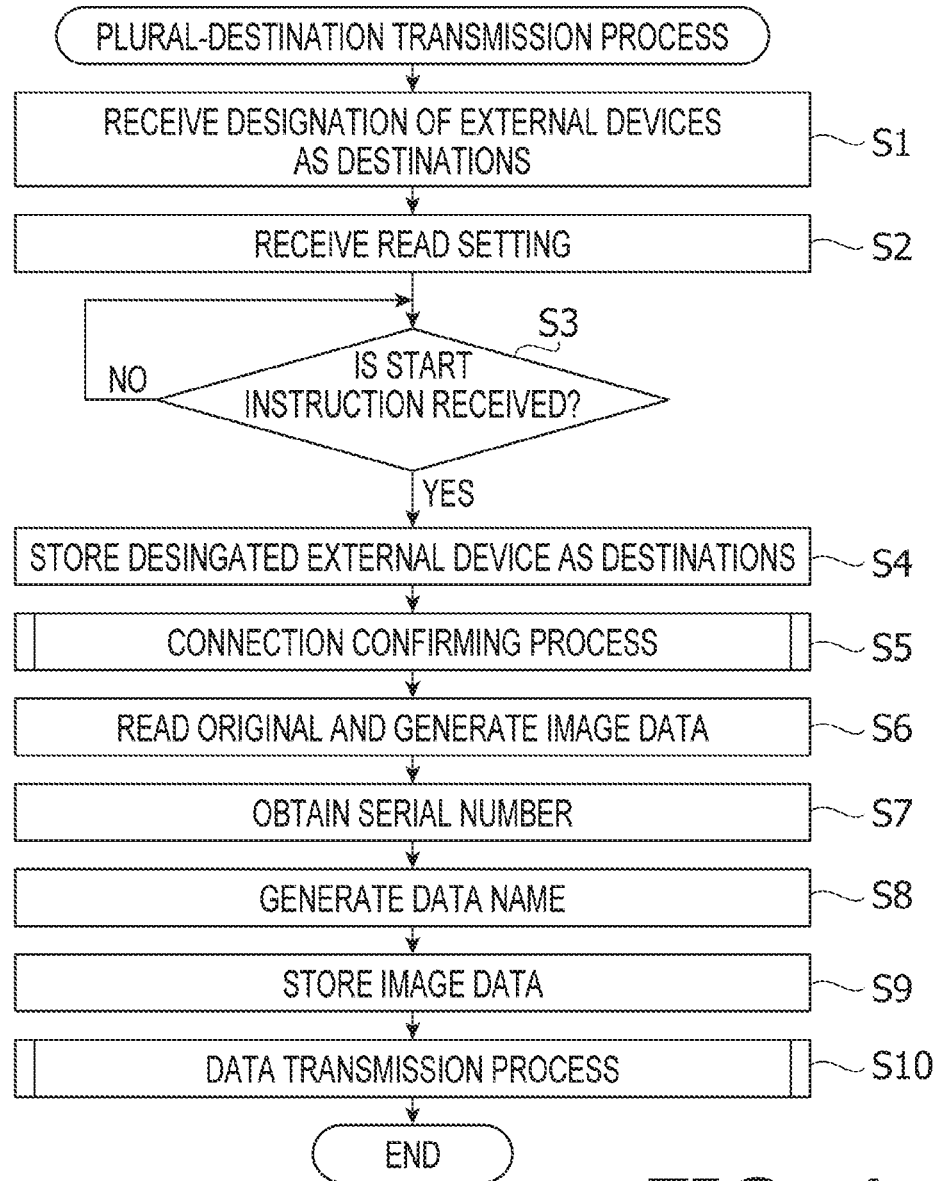
FIG. 4 is a flowchart illustrating a plural-destination transmission process.

When the destination address is received, the MFP 100 creates the transmission destination list. The MFP 100 generates the transmission destination records containing the transmission method, the destination address, the log-in name and the password in accordance with the order of designation, and registers the record with the transmission destination address. For example, it is assumed that, in the telephone book shown in FIG. 3, if a branch A is designated first, and then the branch C is designated. In such a case, as shown in FIG. 4, as the first record, the protocol "FTP" which is used in the FTP server A of the branch A is registered as the transmission method, and "Profiles A" of the FTP server A is registered as the destination address. Further, a log-in name "aaa" for the FTP server A is registered in the field of the log-in name, and a password "111" is registered in the field of the password. As the second record, the protocol "CIFS" which is used in the CIFS server A of the branch C is registered as the transmission method, while the shared folder address of the CIFS server A will be registered as the destination address. Further, a log-in name "bbb" is registered in the field of the log-in name, and a password "222" is registered in the field of the password.

When the transmission destination list has been created, the MFP 100 controls the image reader 20 to read an image on an original document and generates image data. Then, the MFP 100 controls the RAM 33 to store the thus generated image data. Thereafter, the MFP 100 connects with the external devices in accordance with the order of the transmission destination list, and transmits the image data stored in the RAM 33. That is, the MFP 100 completes transmission of the image data to the external device having been registered earlier, and thereafter, the MFP 100 starts transmitting the image data to the external device having been registered later.

If the data name of the image data to be transmitted to the external device overlaps one or more of the data names of the image data having already been stored in the external devices, the MFP 100 cannot transmit the image data of the original document to the external devices storing the image data having the same data name as the image data of the original document to be transmitted from the MFP 100 in order to prevent the image data stored in the external devices overwritten with the transmitted image data of the original document. If transmission of the image data to some of the external devices has been successfully completed, but transmission to the other external devices has been failed, there will be no guarantee that the same image data is remained in all the destination external devices, and the successfully completed data transmission becomes useless.

Therefore, the MFP 100 obtains lists of data names of the image data stored in all the destination external devices after the image on the original document has been read and before the image data of the original document is transmitted, and determines whether a data name same as the data name of the image data of the original document is included in the lists obtained from the plurality of destination external devices. Only when the none of the lists includes the data name of the image data of the original document, the MFP 100 transmits the image data to all the destination external devices. According to the above configuration, it is possible to avoid a situation that the image data cannot be transmitted due to overlap of the data name.

Next, a plural-destination transmission process executed by the MFP 100 will be described with reference to the flowchart shown in FIG. 5. The plural-destination transmission process is executed by the CPU 31 in response to receipt of the plural-destination transmission instruction which is input through the button group 42.

In the plural-destination transmission process, the CPU 31 firstly receives user's selection of the external devices which are the transmission destinations (S1). The external devices which are the transmission destination may be designated, for example, through the destination designation screen 52 displayed on the LCD 41. In this case, the external devices are selected from the telephone book stored in the NVRAM 34 of the MFP 100 and/or manually designated through the button group 42.

Next, the CPU 31 receives a read setting through the button group 42 (S2). In the read setting, a condition to read the image on the original document and generate the image data is set. The read setting may include, for example, a setting of data format when the image data is stored in the RAM 33.

Thereafter, when a start instruction is received through the button group (S3: YES), the CPU 31 stores information identifying the external devices in the NVRAM 34 as the transmission destinations (S4). That is, the CPU 31 creates the transmission destination list 51 based on the external devices designated in S1. Then, the CPU 31 stores the transmission destination list 51 in the NVRAM 34.

Next, the CPU 31 executes a connection confirming process (S5) in which the CPU 31 attempts to establish a connection with all the designated external devices and checks whether the connection with respective external devices can be established. The connection confirming process is an example of an establishment process. When there is an external device with which the connection cannot be established is included in the designated external devices, it will not be guaranteed that the same image data is stored in all the designated external devices. Therefore, the CPU 31 checks whether the connection can be established with all the designated external devices before reading an image on the original document and generating the image data. According to the above configuration, it is more likely that a situation where a process of reading the image on the original document and generating the image data becomes wasted. The connection confirming process will be described in detail later.

Then, the CPU 31 causes the image reader 20 to read the image on the original document, and generates the image data (S6). It is noted that a process in S6 is an example of a generating process. The image reader 20 may read images on the original documents conveyed by a not-shown ADF or read an image on an original document which is placed on a platen by the user.

Next, the CPU 31 obtains a serial number (S7). The serial number is a number of pages of the original document counted when the MFP 100 controls the image reader 20 to read the image on the original document.

Then, the CPU 31 generates a data name to discriminate the generated image data from other pieces of image data (S8). The user can select, as the method of generating the data name, between an automatic setting method and a manual setting method. The automatic setting method is a method in which the MFP 100 automatically generates the data name. When the automatic setting method is selected, the CPU 31 generates the data name, for example, by combining the serial number obtained in S7 with a particular character string "IMG" (e.g., "IMG0021"). The manual setting method is a method according to which the user generates the data name by operating the button group 42.

Thereafter, the CPU 31 stores the image data in the RAM 33 (S9). The process in S9 is an example of a storing process. That is, the CPU 31 controls the RAM 33, for example, to name the image data of the image on the original document read in S6 the data name set in S8, and stores the same.

When, for example, the data format is set to a PDF in S2, the CPU 31 stores one piece of image data in the RAM 33 when an image of one sheet of the original document is read, or when images of a plurality of original sheets are read. On the other hand, when, for example, the data format is set to the JPEG in S2, the same number, as the number of pages of original document, of pieces of image data are stored in the RAM 33.

Next, the CPU 31 executes a data transmission process to transmits the image data (S10). The CPU 31 obtains, in S1, lists of the data names regarding the image data stored in the external devices designated in S1 from the designated external devices. Then, the CPU 31 determines whether the data name of the original document is included in the obtained lists. When it is determined that the data name of the original document is included in none of the obtained lists, the CPU 31 transmits the image data of the original document to the designated external devices sequentially. When it is determined that the data name of the image data of the original document is included in at least one of the obtained lists, the CPU 31 does not transmits the image data to the designated external devices. The data transmission process will be described in detail later.

When the data transmission process is terminated, the CPU 31 terminates the plural-destination transmission process.

Next, the connection confirming process called in S5 of FIG. 4 will be described in detail with reference to a flowchart shown in FIG. 5.

Initially, the CPU 31 initializes an order N of the external devices to which the image data of the original document is to be transmitted (S21). Then, the CPU 31 add "1" to the order N (S22). Hereafter, the CPU 31 counts the order of the external devices to which the image data is to be transmitted.

Next, the CPU 31 obtains authentication information of an N-th destination external device (S23). The transmission destination list 51 stored in the RAM 33 defines the order of the external devices to which the image on the original document is to be transmitted. Therefore, the CPU 31 retrieves the N-th destination record from the transmission destination list 51, and extracts the log-in name and the password registered with the retrieved record as the authentication information.

Next, the CPU 31 controls the network I/F 37 to attempt to log in to the N-th destination external device (S24). That is, the CPU 31 controls the network I/F 37 to transmit the authentication information (i.e., the log-in name and the password) obtained in S23 to a destination address registered with the N-th destination record in accordance with a transmission method which is also registered with the N-th destination record, thereby attempting to connect with the N-th destination external device.

The CPU 31 determines whether the log-in to the N-th destination can be done (S25). When a response from the N-th external device is received, the CPU 31 determines that the connection (communication) is established with the N-th external device and can be logged in (S25: YES). In such a case, the CPU 31 controls the network I/F 37 to log off from the N-th destination external device (S26). That is, the CPU 31 controls the network I/F 37 to disconnect the network connection with the N-th destination external device. For example, when there are many destination external devices, a period of time for checking whether the communication can be established to each of the external devices, a time period until the image data is transmitted to each of the external devices will become relatively long. Further, it is unnecessary to connect the MFP 100 with the external devices when the MFP 100 reads the image on the original document. Therefore, the CPU 31 allows the external devices being used by another device until the image data is transmitted to each of the external devices by once disconnecting the communication with the external devices to which logging-in was successfully done.

The CPU 31 determines whether there is a destination to which logging-in has not been attempted (S27) when logging off from the N-th destination. This process is executed since, for all the designated external devices, it is necessary to check whether communication can be established.

The CPU 31 attempts logging in to the external devices in accordance with the order of registration with the transmission destination list 51 stored in the RAM 33. Therefore, when there is a destination record which has not been read from the transmission destination list 51, the CPU 31 determines that there is another destination to which log-in has not yet been attempted (S27: YES), and executes steps S22 onwards. Thus, the CPU 31 determines whether communication can be established with a next order external device after confirming that the communication can be established to the preceding order external device. Since the CPU 31 attempts to log in to the external device in accordance with the order in the transmission destination list 51, it is possible to determine whether the communication (e.g., the network connection) can be established for all the designated external devices without fail.

When the CPU 31 can log in, by repeatedly executing steps S22-S27, to all the external devices registered with the transmission destination list 51 (S27: NO), the CPU 31 proceeds to S6, controls the image reader 20 to read the image on the original document. That is, the CPU 31 causes the image reader 20 to read the image on the original document and generate image data when the communication can be established with all the designated external devices.

During sequential attempt to log in to the external devices, when there is an external device to which the CPU 31 cannot log in (S25: NO), the CPU 31 controls the LCD 41 and display "Connection Failed" as an image indicating the connection cannot be established with the destination external device (S28). With this configuration, the user can recognize that the reason which the image data cannot be transmitted is incapability of establishment of communication with a particular external device. On the screen displayed at this stage, information identifying the external device with which the communication cannot be established. According to such a configuration, the user may identify the external device to which the connection was failed, and handle the problem by, for example, notifying a user of the external device in question and asking the user to fix the device.

Since the CPU 31 displaying the above notifying screen cannot store the image data in the external device with which the communication cannot be established, the CPU 31 terminates the plural-destination transmission process. That is, when the communication cannot be established with at least one of the plurality of designated external devices, the CPU 31 does not cause the image reader 20 to read the image on the original document.

As above, the MFP 100 determines whether communication can be established with the plurality of designated external devices before causing the image reader 20 to read the image on the original document. If there exists an external device with which the communication cannot be established, the MFP 100 does not cause the image reader 20 to read the image on the original document, and does not generate the image data of the original document. Accordingly, the MFP 100 does not transmit the image data of the original document to none of the designated external devices. That is, when the MFP 100 cannot establish the connection with at least one of the plurality of designated external devices, and thus, there is no guarantee that the same image data will be stored in all the plurality of external devices, it is possible to avoid a control of unnecessary reading of the image on the original document by the image reader 20 or unnecessary transmission of the image data.

The CPU 31 initializes the order N of the external devices to which the image data is to be transmitted (S41). Then, the CPU 31 add "1" to the order N (S42), retrieves the log-in name and the password (i.e., the authentication information) for the N-th destination from the transmission destination list 51 (S43), and attempts to log in to the N-th transmission destination (S44). Then, the CPU 31 determines whether the CPU 31 can log in to the N-th transmission destination (S45). Since steps S41-S45 are similar to S21-S25 in FIG. 5, description thereof will be omitted.

When the CPU 31 cannot log in to the N-th transmission destination (S45: NO), the CPU 31 controls the LCD 41 to display "connection failed" which is an image indicating that the connection cannot be established with the N-th transmission destination (S53). Since the process of S53 is the same as the process in S28, description thereof will be omitted.

After displaying the "connection failed" on the LCD 41, the CPU 31 deletes the image data of the original document stored in the RAM 33 (S54). When it is determined that the CPU 31 cannot establish a communication with one of the designated external devices, there becomes no guarantee that the same image data is transmitted to all the designated external devices. Therefore, it becomes unnecessary to transmit the image data of the image which the image reader 20 read from the original document. Therefore, the CPU 31 deletes the image data, which becomes unnecessary, from the RAM 33, thereby securing the available capacity of the RAM 33.

When it is determined that the CPU 31 can log in to the N-th transmission destination (S45: YES), the CPU 31 controls the network I/F 37 to transmit a list request requesting for a list of the data names regarding the image data stored in the N-th destination external device to the N-th destination external device (S46). The process of S46 is an example of a list requesting process. Each external device has a list containing data names of the image data stored in the storage thereof. Thus, the CPU 31 requests the external device to provide the list with the MFP 100.

When the list of the data names of the image data stored in the N-th transmission destination is received from the N-th destination external device (S47), the CPU 31 stores the received list in the RAM 33 (S48). The process of S47 is an example of a list receiving process. Thereafter, the CPU 31 logs off from the N-th transmission destination, and disconnects the communication with the N-th destination external device (S49). With this configuration, the N-th destination external device can be used by another device until the MFP 100 starts transmitting the image data to the N-th destination external device.

In S50, the CPU 31 determines whether the CPU 31 has logged in to all the transmission destinations. When the CPU 31 has not logged in to all the transmission destinations (S50: NO), there are one or more external devices from which the lists have not been received. Therefore, the CPU 31 returns to S42, and attempts to obtain a list of the data names from the next-order external device. That is, by repeating the steps S42-S50, the CPU 31 establish the communication with the designated external devices sequentially, in accordance with the order registered with the transmission destination list 51 and obtains the lists from respective external devices.

When it is determined that the CPU 31 has logged in all the transmission destinations (S50: YES), since the lists for all the designated external devices have been obtained, the CPU 31 determines whether the data name of the image data stored in the RAM 33 is included in any of the received lists (S51). It is noted that the process of S51 is an example of a data name determining process.

Figure 7:
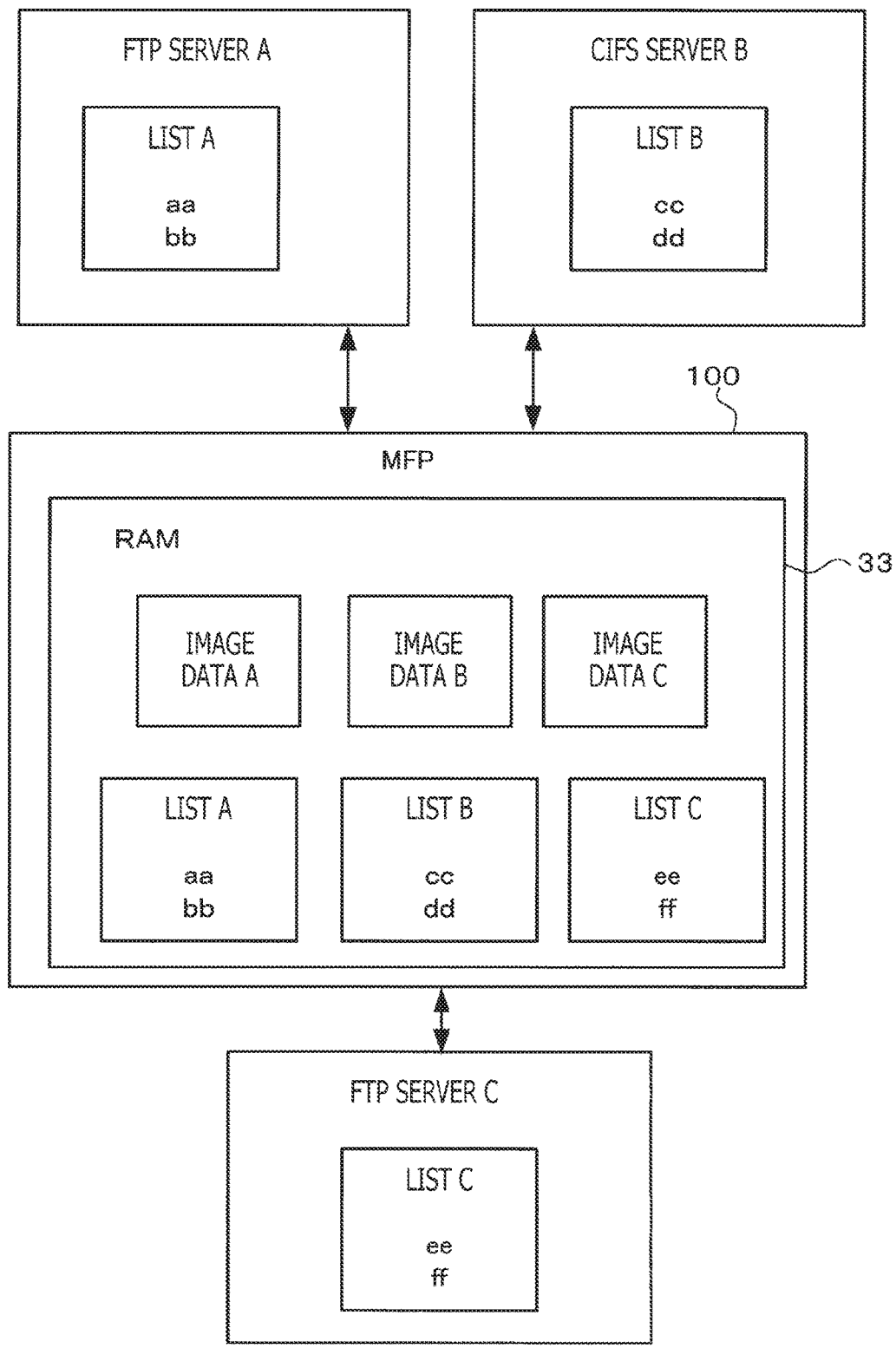
FIG. 7 is conceptual chart illustrating a process of determining existence of a data name.

It is assumed, for example, that an FTP server A, a CIFS server B and an FTP server C are designated as the transmission destinations as shown in FIG. 7. The FTP server A, the CIFS server B and the FTP server C has lists A, B and C of the data names regarding the image data stored in the storages of the FTP server A, the CIFS server B and the FTP server C, respectively. When the MFP 100 establishes a communication with the FTP server A, the MFP 100 request the FTP server A to transmit the list A of the data names regarding the image data to the MFP 100. When the list A is received from the FTP server A, the MFP 100 stores the list A in the RAM 33. Similarly, the MFP 100 sequentially obtains the lists B and C from the CIFS server B and the FTP server C, respectively, and stores the lists B and C in the RAM 33.

It is further assumed that image data A, B and C generated by the image reader 20 are stored in the RAM 33. The CPU 31 of the MFP 100 determines whether each of the names respectively assigned to the image data A, B and C is included in the lists A, B and C stored in the RAM 33.

When it is determined that each of the data names respectively assigned to the image data A, B and C does not match any of data names "aa" and "bb" registered with the list A, "cc" and "dd" registered with the list B, and "ee" and "ff" registered with the list C, the CPU 31 determines that the data names of the image data A, B and C are not included in any of the lists A, B and C (S51: NO). When it is determined that at least one of the data names respectively assigned to the image data A, B and C matches any of data names "aa" and "bb" registered with the list A, "cc" and "dd" registered with the list B, and "ee" and "ff" registered with the list C, the CPU 31 determines that at least one of the data names of the image data A, B and C is included in any of the lists A, B and C (SM: YES).

Figure 6:
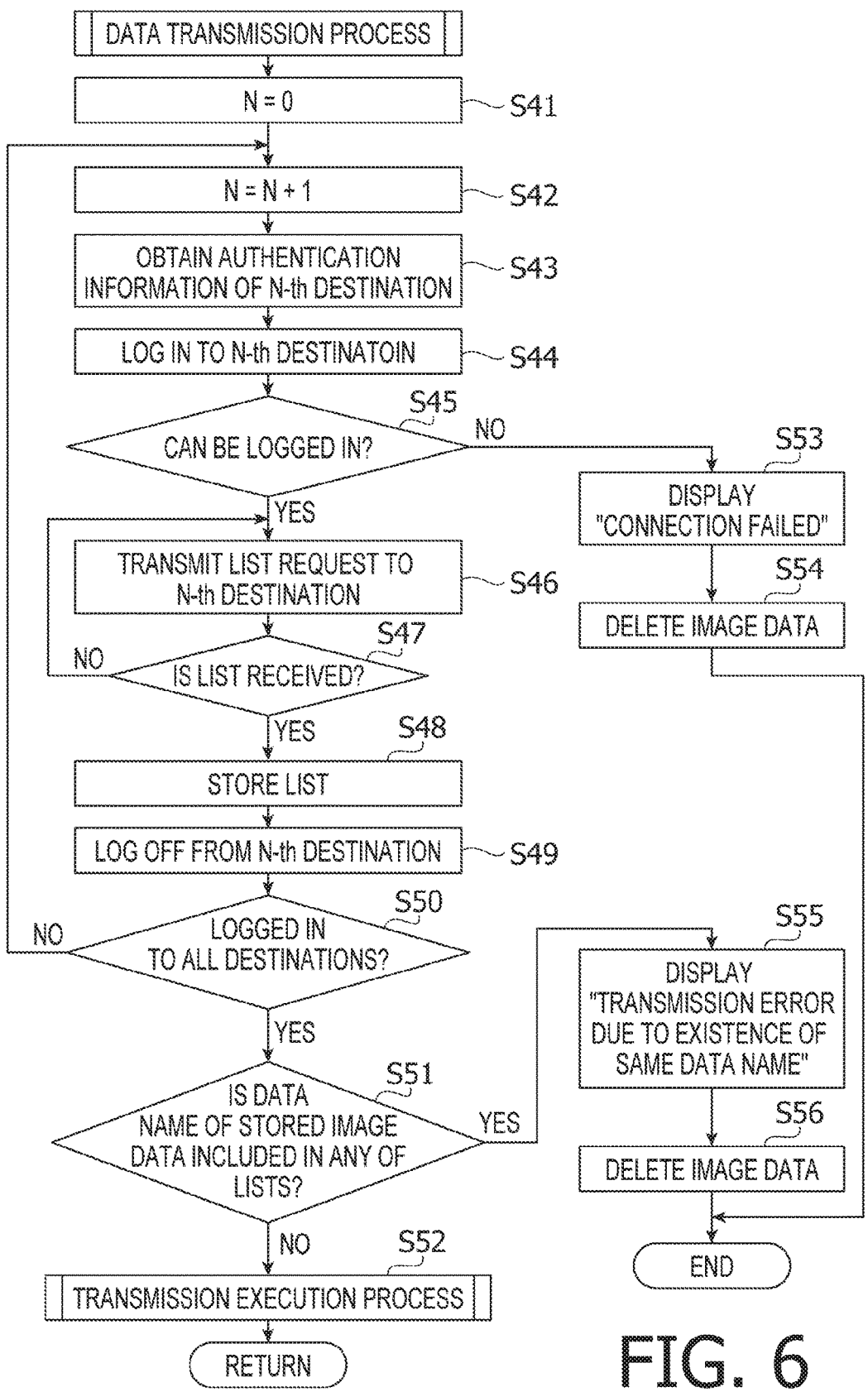
FIG. 6 is a flowchart illustrating a data transmission process.

As shown in FIG. 6, when it is determined that at least one of the data names of the image data of the original document stored in the RAM 33 is included in any of the lists received from the designated external devices (S51: YES), the CPU 31 does not proceed to the transmission execution process in S52, and does not transmit the image data of the original document to any one of the designated external devices. Since at least one of the data names overlap the data name of the image data stored in any of the designated external devices, the image data of the original document cannot be transmitted to the external device storing the image data having the overlapping data name.

In such a case, the CPU 31 controls the LCD 41 to display an indication "transmission error due to existence of same data name" which is an indication notifying that the image data cannot be transmitted since the image data having the same data name as the data name of the original document is stored in at least one of the external devices (S55). With this configuration, the use can recognize that the image data of the original document cannot be transmitted to the designated external devices since the data name of the image on the original document overlaps the data name of image data stored in any of the designated external devices. In such a case, the user can change the data name with user of the button group 42 and the like to eliminate the cause of the failure of transmission, and retry to transmit the image data of the original document.

Thereafter, the CPU 31 deletes the image on the original document from the RAM 33 (S56), and terminates the plural-destination transmission process. By deleting the image data which will not be transmitted from the RAM 33, it becomes possible to prevent the unnecessary image data from occupying a capacity of the RAM 33, and an available capacity of the RAM 33 can be secured. After deleting the image on the original document, the CPU 31 terminates the plural-destination transmission process. At the same time, the CPU 31 may delete the received lists of the data names from the external devices, in order to further secure the available capacity of the RAM 33.

When it is determined that the data names of the image data stored in the RAM 33 are not included in any of the lists received from the external devices (S51: NO), since the data names of the image data do not overlap the data names of any of the designated external devices, the CPU 31 executes the transmission execution process to transmit the image data (S52). The process of S52 is an example of a transmission process.

Next, the transmission execution process will be described with reference to the flowchart shown in FIG. 8. After initializing (i.e., setting to "0") the order N of transmission of the image data of the original document (S61), the CPU 31 adds "1" to the order N (S62). Thereafter, the CPU 31 retrieves the authentication information (i.e., the log-in name and the password) of the N-th transmission destination from the transmission destination list 51 (S63), and attempts to log in to the N-th transmission destination (S64). Then, the CPU 31 determines whether the CPU 31 can log in to the N-th transmission destination (S65). Since the processes in S61-S65 are same as the processes in S21-S5, description thereof will be omitted.

When the CPU 31 cannot log in to the N-th transmission destination (S65: NO), the CPU 31 does not transmit the image data to any of the designated external devices. For example, a lot of transmission destinations are designated and the number of sheets of the original document is relatively large, a time duration for executing the connection confirming process and a time duration for reading the original document become longer. In such a case, for example, an external device with which the communication was once established during the connection confirming process may not be connectable, when the image data is to be transmitted, as a network cable is removed or, if a wireless communication is employed, the communication may not be established due to deterioration of a radio environment. In such a case, the MFP 100 cannot log in to the external device to establish the communication, and cannot transmit the image data to the external device. Then, since there is no guarantee that the same image data is transmitted to all the designated external devices, the CPU 31 does not transmit the image data to any of the designated external devices.

In this case, the CPU 31 displays an indication of "connection failed" on the LCD 41 (S70). Then, the CPU 31 deletes the image data of the original document from the RAM 33 (S71), and terminates the plural-destination transmission process. Since the processes in S70 and S71 are the same as the processes in S53 and S54 in FIG. 6, description thereof will be omitted.

When the communication with the N-th destination external device is established and the CPU 31 can log in to the N-th destination external device (S65: YES), the CPU 31 starts transmitting the image data of the original document stored in the RAM 33 to the N-th destination external device (S66). Then, the CPU 31 determines whether the transmission of the image data has been successfully completed (S67). This determining process is necessary since, for example, the network cable may be removed, or the radio environment may be deteriorated during transmission of the image data, and the image data may not be successfully transmitted. Such a problem would likely to occur as the number of pieces of image data to be transmitted is larger.

When the transmission of the image data has not been successfully completed (S67: NO), the CPU 31 does not transmit the image data, but controls the LCD 41 to display the indication of "transmission failed" indicating that the transmission of the image data is failed (S72). With this configuration, the user can recognize failure of the transmission of the image data and displays the indication of "transmission failed" (S72). With this configuration, the user can recognize the failure of transmission of the image data due to a trouble which is occurred when the image data is being transmitted.

Thereafter, the CPU 31 logs off from the N-th destination external device (S73). Since it becomes unnecessary that the MFP 100 is kept connected to the N-th destination external device, the CPU 31 logs off therefrom so that another device can use the external device. Next, the CPU 31 deletes the image data stored in the RAM 33 (S74). The image data is deleted since it is not guaranteed that the same image data is stored in a plurality of external devices, the unnecessary image data is deleted from the RAM 33 so that the available capacity of the RAM 33 is secured. After deletion of the image data, the CPU 31 terminates the plural-destination transmission process.

When the transmission of the image data has been completed normally (S67: YES), the CPU 31 log off from the N-th destination external device (S68). After the image data is transmitted, it is unnecessary to keep the CPU 31 connected with the N-th transmission destination. Therefore, upon completion of transmission of the image data to the N-th transmission destination, the CPU 31 immediately disconnects the connection with the N-th transmission destination, so that another device can use the N-th order destination external device.

Thereafter, the CPU 31 determines whether the image data has been transmitted to all the transmission destinations (S69). When the image data has not yet been transmitted to all the transmission destination (S69: NO), the CPU 31 returns to S62. That is, after the image data is transmitted to a preceding order external device, the CPU 31 transmits the image data to the next order external device.

When the image data has been transmitted to all the transmission destinations (S69: YES), the CPU 31 terminates the plural-destination transmission process.

As described above, the MFP 100 according to the present embodiment determines, after the original document is read and before the image data of the original document is transmitted, whether there exists data having the same data name as the image data of the original document in the transmission destination external devices. When it determined that none of the destination external devices stores data having the same data name as the image data of the original document read by the image reader 20, the MFP 100 transmits the image data of the original document to the plurality of destination external devices. According to the above configuration, a possibility to avoid a case where transmission of the image data to part of the destination external devices is successfully completed while transmission to the other part of the destination external devices is failed can be raised.

Concretely, for example, after the image reader 20 reads the image on the original document, the CPU 31 obtains the lists regarding the image data from all the external devices registered with the first through sixth destination records of the transmission destination list 51 shown in FIG. 3 before transmitting the image data. Then, the CPU 31 determines whether the data name of the image data stored in the RAM 33 is included in the obtained lists. If, for example, the data name of the image data of the original document is not included in the lists obtained from the external devices respectively registered with the first and third through sixth destination records of the transmission destination list 51, while the data name of the image data of the original document is included in the list obtained from the external device which is registered with the second destination record of the transmission destination list 51, the MFP 100 does not transmit the image data of the original document to any of the first to sixth external devices. Therefore, in the above example, it is possible to avoid a situation where the image data of the original document is stored in the first and third through sixth external devices, while the image data of the original document is not stored in the second external device.

According to the above configuration, the user who fails to transmit the image data to the plurality of destination external devices need not perform troublesome operations to find the external devices to which the transmission of the image data is failed and re-transmit the image data only to the external devices to which the transmission was failed. The convenience above is significant when the number of transmission destinations are larger. Further, when the data name overlaps and the image data is transmitted with a changed data name, since the image data assigned with the previous data name is not transmitted, the external devices do not store the same image data unnecessarily. Furthermore, according to this configuration, users of the destination external devices need not check whether the received image data is same as existing image data which has already been stored therein.

Next, a second embodiment of the present disclosures will be described. The image reading device according to the second embodiment is different from the first embodiment by the method of detecting the access error in the data transmission process. According to the first embodiment, the image reading device detects transmission error due to overlap of the data name. According to the second embodiment, the image reading device detects a transmission error due to shortage of an available capacity of the external device. Except for the above point, the configuration of the image reading device according to the second embodiment is substantially the same as the configuration of the image reading device according to the first embodiment. Therefore, in the following description, detection of the transmission error due to the shortage of the available capacity will be mainly described with reference to the flowchart shown in FIG. 9. Components/configurations of the second embodiment common to those of the first embodiment will be assigned with the same reference numbers as in the first embodiment, and description thereof will be simplified or omitted.

When the communication is established with the N-th order destination external device (S41-S44, S45: YES), the CPU 31 controls the network I/F 37 to transmit a size request requesting the N-th destination external device to transmit, to the MFP 100, information regarding storable data size the N-th destination external device has (S81). The storable data size the external device has is an empty capacity in a storage area provided to the external device. When the external device is a network server possessed by a plurality of users such as the CIFS server, the empty capacities of the storage area assigned to respective users are regarded as the empty capacities, and the CPU 31 requests the server (e.g., the CIFS server) to transmit information regarding the empty capacities for the respective users. If the external device is for a data transmission such as the FTP server, the physically empty capacity of the storage of the server is regarded as the storable data size of the external device, and the CPU 31 requests the server to transmit information regarding the physically empty capacity.

When the CPU 31 controls the network I/F 37 to receive the information regarding the storable data size from the N-th destination external device (S82: YES), the CPU 31 store the information regarding the storable data size in the RAM 33 (S83).

Next, the CPU 31 logs off from the N-th transmission destination (S49). With this configuration, other devices can used the N-th destination external device. Thereafter, the CPU 31 determine whether the CPU 31 has logged in all the destination external devices (S50).

When it is determined that the CPU 31 has not logged in to all the transmission destinations (S50: NO), the CPU 31 returns to S42. By executing the processes of S42-S45, S81-S83, S49 and S50, the CPU 31 sequentially obtains information regarding the storable data sizes from all the destination external devices.

After obtaining the storable data sizes from all the destination external devices (S50: YES), the CPU 31 determines whether the size if the image on the original document read by the image reader 20 is larger than each of the storable data sizes respectively obtained from the destination external devices (S84). The process in S84 is an example of a size determining process.

When the size of the image data of the original document is not larger than any of the data sizes received from the destination external devices (S84: NO), it is possible to store the image data of the original document in the storage of the N-th destination external device. Therefore, the CPU 31 executes the transmission execution process to transmit the image data of the original document to respective external devices (S52).

When it is determined that the size of the image data of the original document is larger than at least one of the data sizes received from the destination external devices (S84: YES), there exists an external device to which the image data cannot be transmitted (i.e., the imaged data cannot be stored in the storage of the external device). Accordingly, the CPU 31 does not execute the transmission execution process, and does not transmit the image data of the original document to any of the plurality of destination external devices.

In the above case, the CPU 31 controls the LCD 41 to display an indication "transmission error due to shortage of capacity of external device" to indicate that the image data cannot be transmitted due to the shortage of the capacity of the storage of the external device (S85). With this indication, the user can recognize that the transmission error has occurred due to shortage of the capacity of the external device. Then, the user may reduce the number of pixels when the image on the original document is read, or compress the image data so that the size of the image data of the original document is reduced and transmit the image data to respective external devices.

After displaying the transmission failure screen, the CPU 31 deletes the image data of the original document stored in the RAM 33 (S56), and terminates the plural-destination transmission process.

As described above, the MFP 100 according to the second embodiment determines, after reading the image on the original document and before transmitting the image data of the original document, whether the data size of the image data is larger than the storable data size of each of the destination external devices. When it is determined that the data size of the image data of the original document is not larger than any of the storable data sizes of the plurality of destination external devices, the MFP 100 transmits the image data of the original document to the plurality of destination external devices. With this configuration, a possibility to avoid a situation where the transmission of the image data to part of the destination external devices is successfully completed, while transmission to the other part of the destination external devices is failed can be raised.

It should be noted that the above-described embodiment is only an exemplary embodiment and the aspect of the disclosure should not be limited to the above-described embodiment. Rather, various modifications and improvements of the above-described embodiment should be included within the aspects of the present disclosures. For example, the MFP 100 may be any other device which has an image reading function, and could be a scanner.

Optionally, the CPU 31 may display, on the LCD 41, an indication "transmission succeeded" to indicate that the transmission of the image data of the original document has been successfully transmitted to the plurality of destination external devices when the image data can be transmitted to all the destination external devices. Further optionally, the process of displaying a screen notifying failure of the connection (e.g., S28, S53 or S70) or a screen notifying failure of the transmission (e.g., S55, S72 or S85) may be omitted.

The CPU 31 may remain a log of the transmission results of the plural-destination transmission process. In such a log, an error log regarding only errors due to connection errors, transmission errors due to overlap of data name, transmission error due to shortage of the available capacity may be remained. Alternatively, all the transmission results may be recording in the log. Further, the transmission results may be indicated not only by display on the LCD 41 but also by audible messages.

Figure 5:
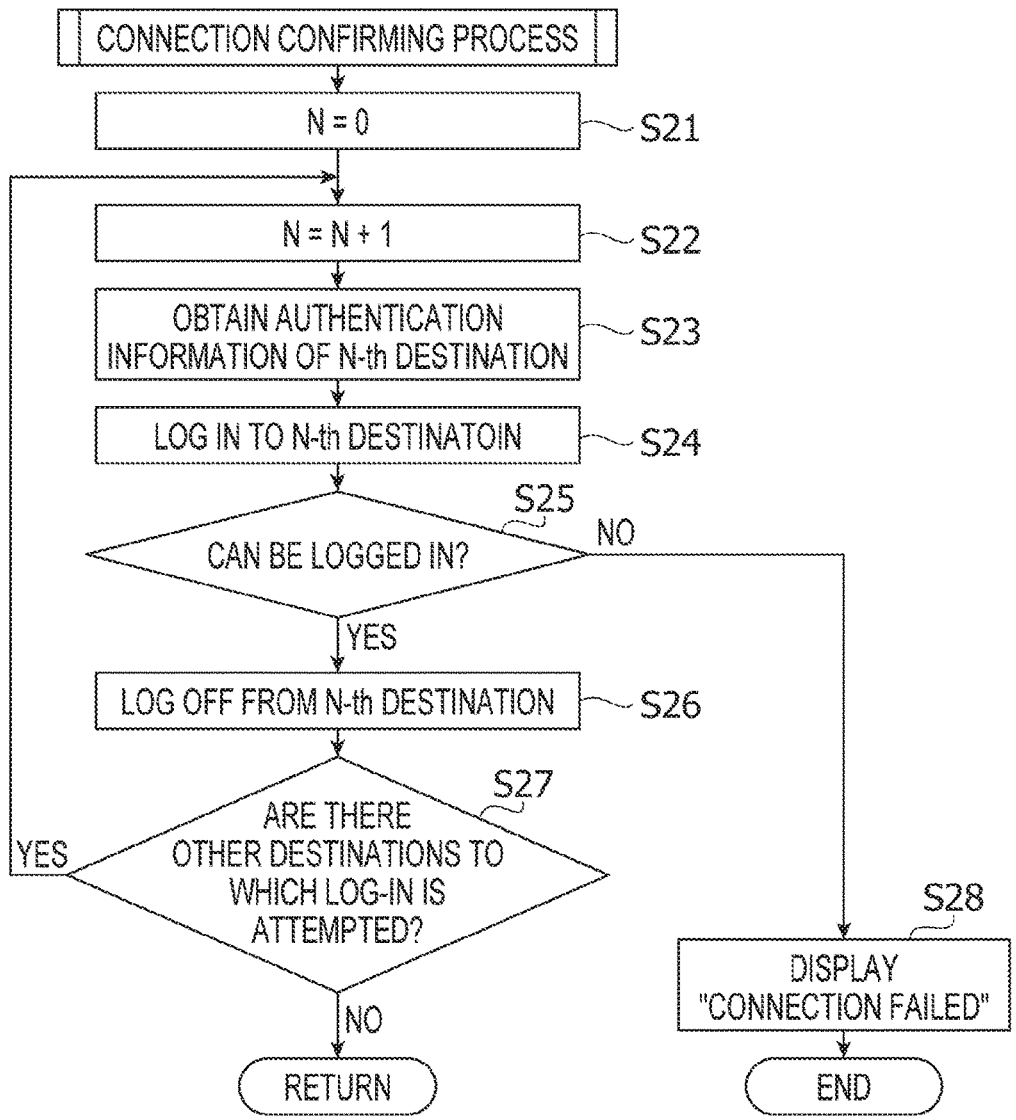
FIG. 5 is a flowchart illustrating a connection confirming process.

In the connection confirming process shown in FIG. 5, the connection is disconnected every time when the connection with each of the transmission destinations is established. However, the timing at which the connection is cut need not be limited to the configuration of FIG. 5. For example, the CPU 31 disconnects communication with all the external devices collectively after establishing the connection to all of the destination external devices. Further, the CPU 31 may not disconnect the communication in the connection confirming process, and control the image reader 20 to read the image on the original document with the communication with the plurality of external devices being established. In such a case, the CPU 31 may disconnect the communication with the plurality of external devices at the same time when the image is read, one by one when the image data is transmitted to the respective external devices, or at the same time when the image data has been transmitted to all the destination external devices.

Figure 9:
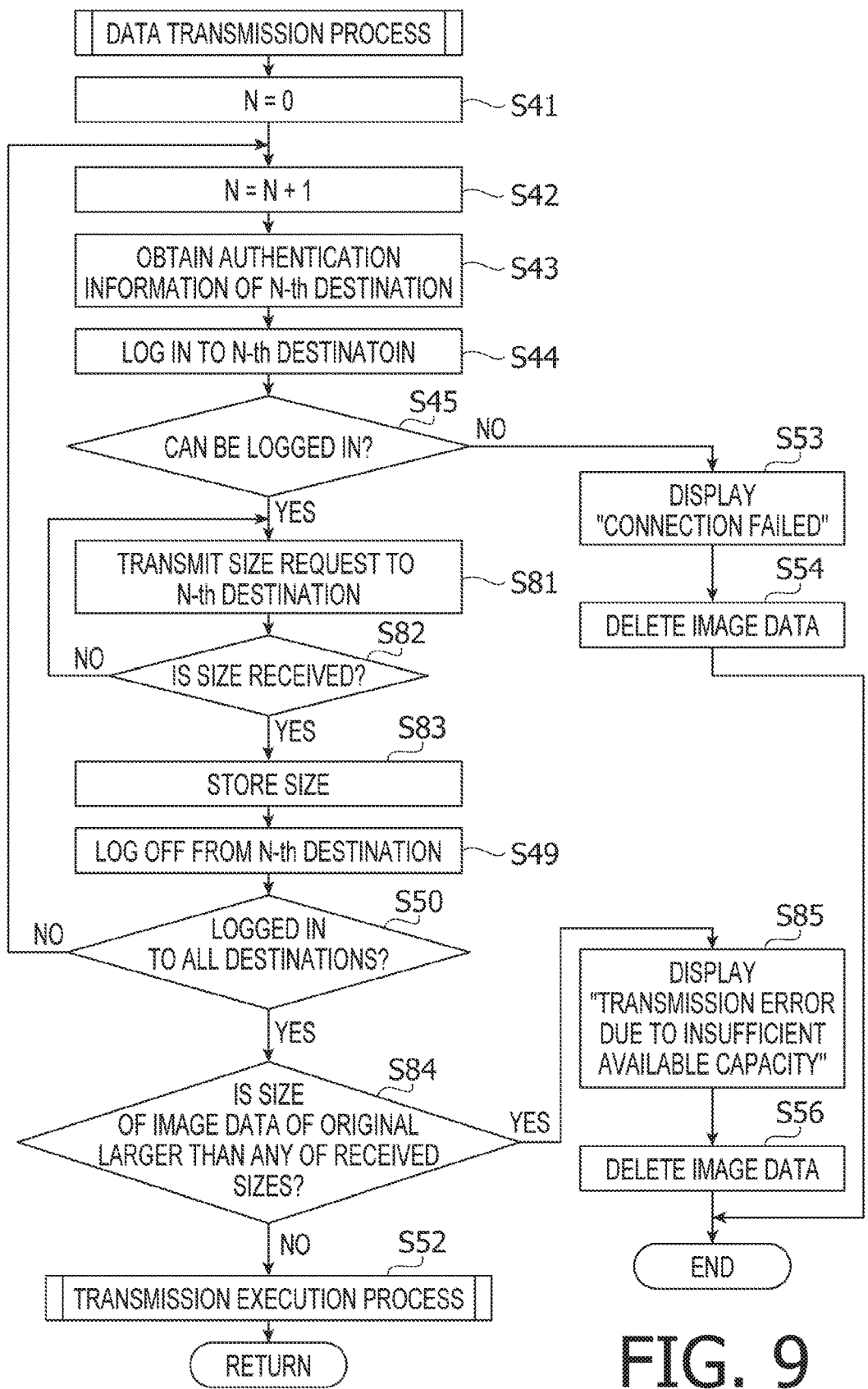
FIG. 9 is flowchart illustrating the data transmission process executed by the image reading device according to a second embodiment of the present disclosures.

In the data transmission process shown in FIG. 6 or FIG. 9, instead of the process of deleting the image data in S65, a screen encouraging the user to change the data name or the data size may be displayed on the LCD 41. Further, when the user operation to change the data name or the data size is received, after the CPU 31 may confirm that image data having a data name same as the changed data name is not included in the destination external devices, or the changed data size is equal to or smaller than the storable data sizes of all of the destination external devices, the CPU 31 may transmit the image data of the original document to the destination external devices. According to this configuration, simply by changing the data name or the data size, without causing the image reader 20 to re-read the image on the original document, the CPU 31 can transmit the image data of the original document to the destination external devices.

Figure 8:
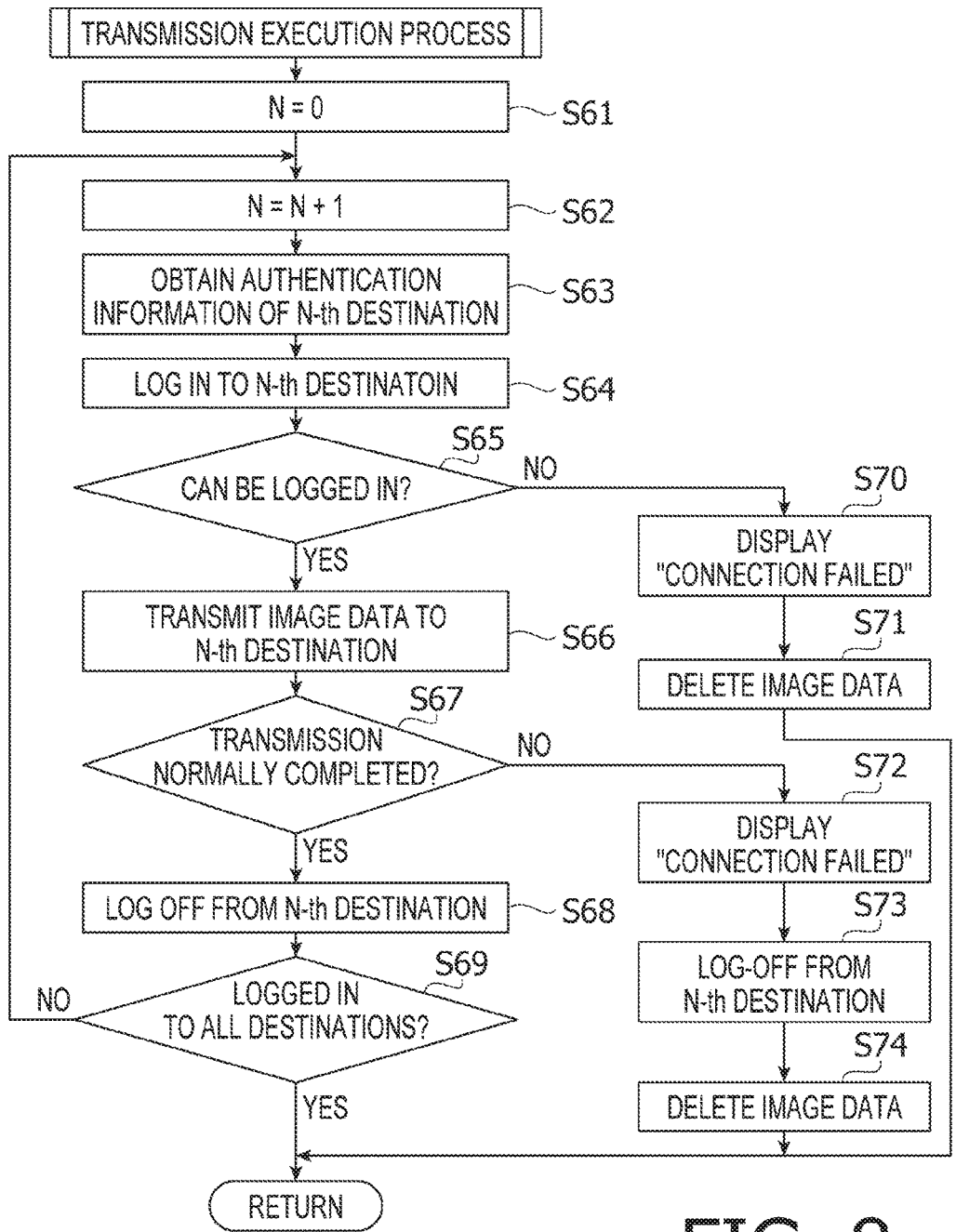
FIG. 8 is a flowchart illustrating a transmission execution process.

In the transmission execution process shown in FIG. 8, the image data of the original document is transmit to the plurality of destination external devices sequentially. However, the image data of the original document may be transmitted to the plurality of destination external devices simultaneously.

In the data transmission process shown in FIG. 6, the CPU 31 logs in to the plurality of external devices sequentially and requests for the lists. However, the configuration may be modified such that the CPU 31 may log in to the plurality of external devices simultaneously and request for the lists. In such a case, when the CPU 31 cannot obtain the list from at least one of the external devices, the CPU 31 may display the indication of "transmission failed" on the LCD 41.

In the data transmission process shown in FIG. 6, the CPU 31 obtains the lists from the plurality of destination external devices. However, the CPU 31 may request the plurality of external devices to transmit data names of the image data stored in respective external devices, generate a list in which the data names received from the plurality of external devices are registered, and store the generated list in the RAM 33. Alternatively, the CPU 31 may request the external devices to transmit the lists and request the external devices which do not have the lists to transmit the data names of the image data stored therein.

The connection confirming process may be omitted. Further, after the image on the original document is read, if the MFP 100 cannot connect with the external devices when requesting the lists or when the image data is transmitted, or when the MFP 100 cannot transmit the image data to the external devices due to overlap of the data name, the CPU 31 may not delete the image data of the original document.

It is noted that, according to the first embodiment, whether the image data can be transmitted to the destination external devices is determined based on the data name, while, according to the second embodiment, whether the image data can be transmitted to the destination external devices is determined based on the data size. It should be noted that the both features may be combined such that whether the image data can be transmitted to the destination external devices is determined based on the data name as well as the data size. In such a modification, only when image data having the data name same as the data name of the image data of the original document is not included in the destination external devices and the data size of the image data of the original document is not larger than the storable capacity of each of the destination external devices, the image data of the original document is transmitted to the destination external devices.

The processes disclosed in the above-described embodiment may be executed by hardware such as a single CPU, a plurality of CPU's and/or an ASIC or a combination thereof. Further, the processes disclosed in the embodiment may be realized by a non-transitory computer-readable recording medium containing programs to execute such processes, methods of performing such processes and/or any other suitable modes.

What is claimed is:

1. An image reading device comprising:
    an image reader configured to read an image on an original document and generate image data corresponding to the image on the original document;
    a communication interface configured to communicate with a first external device and a second external device;
    a storage; and
    a controller,
    wherein, when the first external device and the second external device are designated as transmission destinations of the image data, the controller is configured to execute:
        a generating process of causing the image reader to read the image on the original document and generate the image data;
        a storing process of storing the image data generated by the generating process in the storage with assigning a data name to the image data;
    a list requesting process of controlling the communication interface to:
        transmit a first list request, to the first external device, requesting to transmit a first list to the image reading device, the first list being a list of data names regarding image data stored in the first external device; and
        transmit a second list request, to the second external device, requesting to transmit a second list to the image reading device, the second list being a list of data names regarding image data stored in the second external device;
    a list receiving process of controlling the communication interface to:
        receive the first list transmitted from the first external device; and
        receive the second list transmitted from the second external device;
    a data name determining process of determining whether a data name same as the data name of the image data stored in the storage is included in at least one of the first list and the second list; and
    a data transmitting process of:
        controlling the communication interface to transmit the image data stored in the storage to the first external device and the second external device when it is determined in the data name determining process that the data name same as the data name of the image data stored in the storage is not included in any of the first list and the second list; and
        controlling the communication interface not to transmit the image data stored in the storage to anyone of the first external device and the second external device when it is determined in the data name determining process that the data name same as the image data stored in the storage is included in at least one of the first list and the second list.

2. The image reading device according to claim 1, wherein the controller is further configured to:
    execute an establishment process of controlling the communication interface to establish communication with both the first external device and the second external device;
    execute the generating process when the communication is established with both the first external device and the second external device in the establishment process; and
    not execute the generating process when the communication is not established with at least one of the first external device and the second external device in the establishment process.

3. The image reading device according to claim 2, wherein the communication interface is a network interface,
wherein the controller:
    executes the generating process when a network connection with the first external device and a network connection with the second external device are established in the establishment process; and not executes the generating process when at least one of the network connection with the first external device and the network connection with the second external device is not established in the establishment process.

4. The image reading device according to claim 2, wherein, in the establishment process, the controller is configured to:

establish the connection with the first external device, and then disconnect the connection with the first external device;

establish the connection with the second external device, and then disconnect the connection with the second external device; and start the generating process after the connection with the first external device and the connection with the second external device are disconnected.

5. The image reading device according to claim 2, further comprising a display device, wherein, when the controller determines that the communication with at least one of the first external device and the second external device cannot be established in the establishment process, the controller controls the display device to display an image indicating that communication cannot be established with a transmission destination.

6. The image reading device according to claim 1, further comprising a display device configured to display an image, wherein, when the controller determines in the data name determining process that a data name same as the data name of the image data stored in the storage is included in at least one of the first list and the second list, the controller controls the display device to display an image indicating that the data having the data name same as the data name of the image data stored in the storage exists in transmission destinations.

7. The image reading device according to claim 1, wherein, in the transmitting process, the controller is configured to:

control the communication interface to establish a communication with the first external device and a communication with the second external device, then transmit the image data to the first external device;

after transmission of the image data to the first external device, control the communication interface to disconnect the connection with the first external device; and control the communication interface to disconnect the connection with the first external device, and start transmitting the image data to the second external device; and after transmission of the image data to the second external device, control the communication interface to disconnect the connection with the second external device.

8. The image reading device according to claim 1, wherein, when the image data is not transmitted to the first external device or the second external device in the transmitting process after execution of the generating process, the controller deletes the image data stored in the storage.

9. An image reading device comprising:

an image reader configured to read an image on an original document and generate image data corresponding to the image on the original document;

a communication interface configured to communicate with a first external device and a second external device;

a storage; and a controller, wherein, when the first external device and the second external device are designated as transmission destinations of the image data, the controller is configured to execute:

a generating process of causing the image reader to read the image on the original document and generate the image data;

a storing process of storing the image data generated by the generating process in the storage;

a list requesting process of controlling the communication interface to:

transmit a first size request, to the first external device, requesting to transmit a first size to the image reading device, the first size representing a storable data size of the first external device; and transmit a second size request, to the second external device, requesting to transmit a second size to the image reading device, the second size representing a storable data size of the second external device;

a size receiving process of controlling the communication interface to:

receive the first size representing the storable data size of first external device; and receive the second size representing the storable data size of the second external device;

a size determining process of determining whether a data size of the image data stored in the storage is larger than at least one of the first size and the second size; and a data transmitting process of:

controlling the communication interface to transmit the image data stored in the storage to the first external device and the second external device when it is determined in the data size determining process that the data size of the image data stored in the storage is not larger than each of the first size and the second size; and controlling the communication interface not to transmit the image data stored in the storage to anyone of the first external device and the second external device when it is determined in the size determining process that the data size of the image data stored in the storage is larger than at least one of the first size and the second size.

10. An image data transmission method employed in an image reading device having an image reader configured to read an image of an original document and generate image data corresponding to the image on the original document, a communication interface configured to communicate with a first external device and a second external device and a storage, wherein the method defines transmission of the image data on the original when the first external device and the second external device are designated as transmission destinations of the image data on the original document, the method including:

a generating step of causing the image reader to read the image on the original document and generate the image data;

a storing step of storing the image data generated by the generating step in the storage with assigning a data name to the image data;

a list requesting step of controlling the communication interface to:
  transmit a first list request, to the first external device, requesting to transmit a first list to the image reading device, is the first list being a list of data names regarding image data stored in the first external device; and
  transmit a second list request, to the second external device, requesting to transmit a second list to the image reading device, is the second list being a list of data names regarding image data stored in the second external device;
a list receiving step of controlling the communication interface to:
  receive the first list transmitted from the first external device; and
  receive the second list transmitted from the second external device;
a data name determining step of determining whether a data name same as the data name of the image data stored in the storage is included in at least one of the first list and the second list; and
a data transmitting step of:
  controlling the communication interface to transmit the image data stored in the storage to the first external device and the second external device when it is determined in the data name determining step that the data name same as the data name of the image data stored in the storage is not included in any of the first list and the second list; and
  controlling the communication interface not to transmit the image data stored in the storage to anyone of the first external device and the second external device when it is determined in the data name determining step that the data name same as the image data stored in the storage is included in at least one of the first list and the second list.

11. An image data transmission method employed in an image reading device having an image reader configured to read an image of an original document and generate image data corresponding to the image on the original document, a communication interface configured to communicate with a first external device and a second external device and a storage,
wherein the method defines transmission of the image data on the original document when the first external device and the second external device are designated as transmission destinations of the image data,
the method including:
  a generating step of causing the image reader to read the image on the original document and generate the image data;
  a storing step of storing the image data generated by the generating step in the storage;
a list requesting step of controlling the communication interface to:
  transmit a first size request, to the first external device, requesting to transmit a first size to the image reading device, the first size representing a storable data size of the first external device; and
  transmit a second size request, to the second external device, requesting to transmit a second size to the image reading device, the second size representing a storable data size of the second external device;
a size receiving step of controlling the communication interface to:
  receive the first size representing the storable data size of first external device; and
  receive the second size representing the storable data size of the second external device;
a size determining step of determining whether a data size of the image data stored in the storage is larger than at least one of the first size and the second size; and
a data transmitting step of:
  controlling the communication interface to transmit the image data stored in the storage to the first external device and the second external device when it is determined in the data size determining step that the data size of the image data stored in the storage is not larger than each of the first size and the second size; and
  controlling the communication interface not to transmit the image data stored in the storage to anyone of the first external device and the second external device when it is determined in the size determining step that the data size of the image data stored in the storage is larger than at least one of the first size and the second size.

* * * * *